(12) United States Patent
Busico et al.

(10) Patent No.: US 9,083,144 B2
(45) Date of Patent: Jul. 14, 2015

(54) ARRAY COMPRISING A PLURALITY OF ADJUSTABLE OPTICAL DEVICES

(75) Inventors: Giacinto Busico, Northampton (GB); David Williamson, Daventry (GB); Andrew Cannon Carter, Blisworth (GB); Andrew John Ward, Moulton (GB); Lloyd Nicholas Langley, Northampton (GB)

(73) Assignee: Oclaro Technology Limted, Northhamtonshire (GB)

( * ) Notice: Subject to any disclaimer, the term of this patent is extended or adjusted under 35 U.S.C. 154(b) by 0 days.

(21) Appl. No.: 13/991,879

(22) PCT Filed: Dec. 8, 2010

(86) PCT No.: PCT/IB2010/003170
§ 371 (c)(1),
(2), (4) Date: Jun. 5, 2013

(87) PCT Pub. No.: WO2012/090012
PCT Pub. Date: Jul. 5, 2012

(65) Prior Publication Data
US 2013/0250981 A1      Sep. 26, 2013

(51) Int. Cl.
*G02F 1/035*      (2006.01)
*H01S 3/10*       (2006.01)
*H04B 10/50*      (2013.01)
*H04B 10/80*      (2013.01)
*G02F 1/01*       (2006.01)

(52) U.S. Cl.
CPC ............... *H01S 3/10* (2013.01); *G02F 1/0123* (2013.01); *H04B 10/506* (2013.01); *H04B 10/801* (2013.01)

(58) Field of Classification Search
CPC ....... G02F 1/0123; H01S 3/10; H04B 10/506; H04B 10/801
USPC .................................. 385/3; 359/238; 372/20
See application file for complete search history.

(56) References Cited

U.S. PATENT DOCUMENTS

| | | | |
|---|---|---|---|
| 2002/0070359 A1* | 6/2002 | Kai et al. .................. | 250/504 R |
| 2003/0020981 A1* | 1/2003 | Vujkovic-Cvijin ............ | 359/124 |
| 2004/0218638 A1* | 11/2004 | Carter et al. .................... | 372/20 |

(Continued)

FOREIGN PATENT DOCUMENTS

| | | | | |
|---|---|---|---|---|
| JP | 2000-151012 A | | 5/2000 | |
| JP | 2000151012 A | * | 5/2000 | ............ H01S 5/0687 |

(Continued)

OTHER PUBLICATIONS

PCT International Search Report and Written Opinion, Application No. PCT/IB2010/003170 dated Dec. 8, 2010, 13 pages.

(Continued)

*Primary Examiner* — Peter Radkowski
(74) *Attorney, Agent, or Firm* — Fenwick & West LLP

(57) ABSTRACT

An adjustable array includes a plurality of optical devices. Each adjustable array device has an optical light output therefrom and is configured whereby the corresponding optical lights of the plurality of optical devices have a predefined nonequivalent relationship relative to one another with respect to an output parameter. In response to a drive signal, the plurality of optical devices are further configured to adjust the corresponding optical lights with respect to the output parameter while substantially maintaining the predefined nonequivalent relationship.

24 Claims, 6 Drawing Sheets

(56) References Cited

U.S. PATENT DOCUMENTS

| | | | |
|---|---|---|---|
| 2005/0249509 A1* | 11/2005 | Nagarajan et al. | 398/198 |
| 2007/0014509 A1* | 1/2007 | Kish et al. | 385/14 |
| 2011/0292953 A1* | 12/2011 | Liu et al. | 372/20 |
| 2013/0315269 A1* | 11/2013 | Liu et al. | 372/20 |

FOREIGN PATENT DOCUMENTS

| | | | | |
|---|---|---|---|---|
| JP | 2002-134829 A | | 5/2002 | |
| JP | 2002134829 A | * | 5/2002 | H01S 5/068 |
| JP | 2004-537863 A | | 12/2004 | |
| JP | 2005-175021 A | | 6/2005 | |
| JP | 2005175021 A | * | 6/2005 | H01S 5/0625 |

OTHER PUBLICATIONS

Communication Pursuant to Article 94(3) EPC for European Patent Application No. EP 10816438.5, Apr. 8, 2014, 5 Pages.

Office Action for Japanese Patent Application No. JP 2013-542612, Sep. 2, 2014, 8 Pages.

* cited by examiner

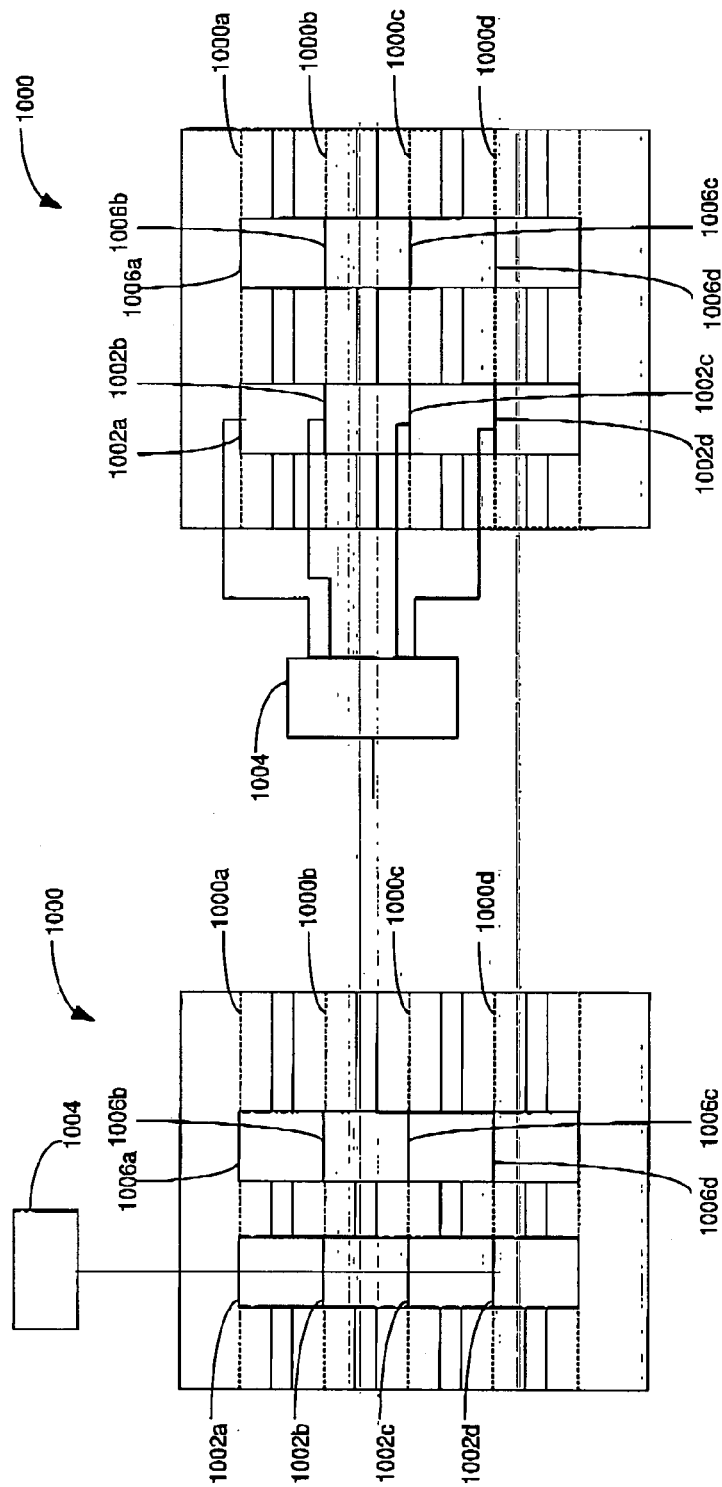

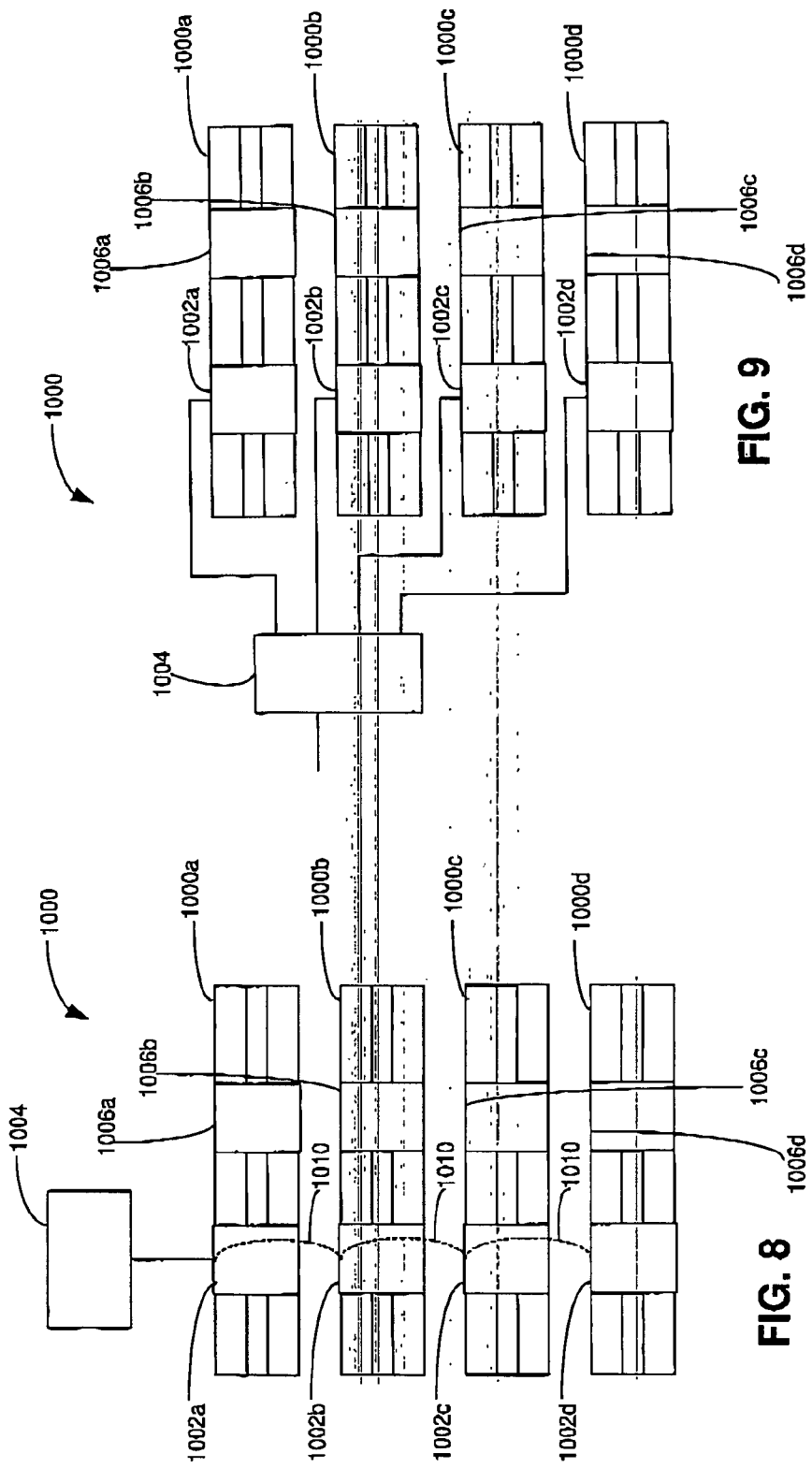

ARRAY COMPRISING A PLURALITY OF ADJUSTABLE OPTICAL DEVICES

TECHNICAL FIELD

The present invention relates generally to adjustable arrays, and in particular to adjustable arrays including a plurality optical devices each having an optical light output therefrom.

BACKGROUND

There is considerable and growing interest in high capacity optical interconnects. Interconnects capable of data rates of minimum 40 Gb/s, preferably 100 Gb/s and more are commonly required in various implementations. Due much in part to difficulties in implementing these data rates in a serial format, parallel multichannel single fiber interconnect implementations (i.e., high data capacity systems) are finding favor.

As an example, parallel multichannel interconnect implementations are implied in the 100 Gb/s small-form-factor pluggable (CFP) standard, a multi-source agreement to produce a common form-factor for the transmission of high-speed digital signals. The CFP standard defines a hot-pluggable optical transceiver form factor that enables transmission applications and data rates up to 100 Gb/s, including next-generation High Speed Ethernet (100 GbE). Pluggable CFP transceivers are capable of supporting the ultra-high bandwidth requirements of data communications and telecommunication networks that form the backbone of the Internet. The electrical interfaces of the CFP standard are only generally defined. But parallel links with an array of ten 10 Gb/s devices are favored for a 100 Gb/s transceiver.

Many conventional parallel multichannel array implementations utilize an array of fixed wavelength lasers or integrated laser modulators and operate at a given wavelength band (e.g., C-band or L-band) within an ITU grid (e.g., 200 GHz spacing, 100 GHz spacing, 50 GHz spacing, etc.). That is, each laser of an array may operate at a particular channel and corresponding frequency (wavelength) of an ITU grid. Grid alignment of each of the lasers in the array is accomplished by specific grating pitch, built in the manufacturing process, combined with some thermal adjustment. As an example, the use of Bragg gratings of varying pitch in a multi-wavelength laser emitting component is disclosed in U.S. Pat. No. 5,930,278.

Arrays of directly modulated lasers (DML) are the simplest implementation. For example, the PD100-TX 100 Gb/s CFP compatible fiber optic transceiver from Santur Corporation includes ten independent channels operating at 10.3125 Gb/s per channel. The PD100-TX incorporates a 10 channel laser driver circuit together with a 10 channel DML array and an optical multiplexer.

But arrays consisting of fixed wavelength lasers such as that described above provide limited versatility. As a consequence, many variants of a given fixed wavelength array would be required to meet the requirements of various short (2 km-10 km), medium, and long reach (above 40 km) implementations on various ITU grids. The reach and environment the array is used in can dictate the choice of variants.

For instance, for a 2-10 km short reach, there is little advantage in using dense WDM (Wavelength Division Multiplex) as this would generally be more costly than a coarse WDM multichannel approach. With short links, the fiber represents a small part of the cost, so additional channels (e.g. of 10, 40 or 100 Gb/s) would be added by providing additional fibers. Typically CWDM configuration operate with 4 or 8 nm spacing between the parallel data carrying paths, so the composite set uses up a substantial part of the available transmission band of the fiber and there is little scope for additional wavelength multiplexing to further increase the capacity in the fiber.

For intermediate/long reaches, the fiber cost and installation is much more significant and generally multiple channels (e.g. of 10, 40 or 100 Gb/s) will be required to be transmitted on the fiber. This is accomplished by using dense WDM, where the spacing between the individual parallel data channels will be typically 50, 100 or 200 GHz. In the case of 50 GHz spacing, the traditional 'C' band of the fiber between around 1525 and 1565 nm, can carry around 100 lanes of data. For 100 GHz, this is around 50. So in the case of an array for this application, a minimum of around ten different variants with different wavelength outputs would be required for 10 channel units operating on 50 GHz grid and around 25 different variants for 4 channel units operating on a 50 GHz grid, with more variants needed for complete flexibility in the starting channel of the array. As the grid widens (e.g. to 100 GHz), the number of variants reduces in principle, although many users will 'interleave' 100 GHz grid devices to use the full 50 GHz grid, giving the same overall number of variants.

SUMMARY OF INVENTION

The present invention provides an adjustable array of a plurality of optical devices each having an optical light output therefrom at a predefined nonequivalent relationship relative to one another with respect to an output parameter. The corresponding optical lights of the plurality of optical devices are adjustable with respect to the output parameter while substantially maintaining the predefined nonequivalent relationship. This allows for simplified set-up and control of the adjustable array. The adjustable array of the present invention is highly versatile, and may be used to meet the requirements of various fixed wavelength interconnect implementations in a 'set and forget' configuration.

The versatility provided by the tunability of the adjustable array allows for the reduction in the number of variants that must be manufactured or retained as inventory by the user. In addition, adjustability in the arrays allows for flexibility and reconfigurability in the network in which the array is utilized. For example, the adjustable array may be implemented in such applications as router-router, cloud computing, server farms, parallel links meeting SONET specifications (e.g., CFP), etc.

In addition to versatility, the adjustable array in accordance with the present invention may allow for the use of a reduced number of contacts, bond wires, and/or current or voltage sources. In one embodiment, the number of bond wires in the adjustable array is reduced to less than that of n×m, where n is the number of optical devices and m is the number of bonds needed for an individual optical device. As a result, the size of the adjustable array may be minimized. The present invention also allows for significant reduction in drive current or voltage. For example, in a ten channel array embodiment, the total tuning current in the array could be reduced to around 100 mA, compared to 500-750 mA for an array of 'standard' lasers.

According to one aspect of the present invention, an adjustable array device includes: a plurality of optical devices each having an optical light output therefrom and configured whereby the corresponding optical lights of the plurality of optical devices have a predefined nonequivalent relationship relative to one another with respect to an output parameter, and wherein, in response to a drive signal, the plurality of optical devices are further configured to adjust the corresponding optical lights with respect to the output parameter while substantially maintaining the predefined nonequivalent relationship.

According to one embodiment, the output parameter is at least one of wavelength, frequency, power, phase, or polarization.

According to another embodiment, each of the plurality of optical devices comprises at least one adjustment section that, in response to the drive signal, adjusts the corresponding optical lights with respect to the output parameter while substantially maintaining the predefined nonequivalent relationship.

According to another embodiment, the adjustable array device of further includes a controller coupled to and configured to output the drive signal to the corresponding at least one adjustment section of the plurality of optical devices.

According to another embodiment, the controller indirectly couples the corresponding at least one adjustment section of the plurality of optical devices.

According to another embodiment, the drive signal comprises multiple signals originating from a main signal.

According to another embodiment, the corresponding at least one adjustment section of the plurality of optical devices are physically coupled to one another and share the drive signal.

According to another embodiment, the corresponding at least one adjustment section of the plurality of optical devices adjusts the optical light by at least one of voltage, current, temperature, or mechanical manipulation.

According to another embodiment, each of the plurality of optical devices includes at least one additional adjustment section that is configured to independently adjust the corresponding optical lights with respect to the output parameter while adjusting the predefined nonequivalent relationship.

According to another embodiment, the predefined nonequivalent relationship comprises the corresponding optical lights of the plurality of optical devices having at least one of an equal offset, unequal offset, or a predefined ratio relative to one another with respect to the output parameter.

According to another embodiment, the predefined nonequivalent relationship comprises the output parameter of the corresponding optical lights of the plurality of optical devices conforming to a first set of respective values prior to the adjustment of the corresponding optical lights with respect to the output parameter, and a second set of respective values subsequent to the adjustment.

According to another embodiment, the predefined nonequivalent relationship comprises the frequency of the corresponding optical lights of the plurality of optical devices conforming to a first set of respective channels of an ITU grid prior to the adjustment of the corresponding optical lights with respect to the output parameter, and a second set of respective channels of the ITU grid subsequent to the adjustment.

According to another embodiment, the plurality of optical devices are further configured to step the corresponding optical lights of the plurality of optical devices along respective channels of an ITU grid.

According to another embodiment, the corresponding optical lights further have an additional output parameter that is equal relative to one another.

According to another embodiment, the plurality of optical devices are monolithically integrated on a single chip.

According to another embodiment, the plurality of optical devices comprises at least one of a plurality of tunable lasers, modulators, photodetectors, semiconductor optical amplifiers, polarization controllers, or phase controllers.

According to another embodiment, the adjustable array device further includes a combiner configured to combine the corresponding optical lights into a combined output.

According to another embodiment, the adjustable array device further includes one or more additional redundant optical devices.

According to another aspect of the present invention, an adjustable array device includes: a plurality of tunable lasers each having an optical light output therefrom and configured whereby the corresponding optical lights of the plurality of tunable lasers have a predefined nonequivalent relationship relative to one another with respect to frequency, and wherein, in response to a drive signal, the plurality of tunable laser devices are further configured to adjust the corresponding optical lights with respect to frequency while substantially maintaining the nonequivalent predefined relationship.

According to one embodiment, each of the plurality of tunable lasers includes a corresponding front grating tuning section that, in response to the drive signal, adjusts the optical light while substantially maintaining the predefined nonequivalent relationship.

According to another embodiment, the adjustable array device further includes a controller coupled to and configured to output the drive signal to the corresponding front grating tuning sections of the plurality of optical devices.

According to another embodiment, the controller indirectly couples the corresponding front grating tuning sections of the plurality of optical devices.

According to another embodiment, the drive signal comprises multiple signals originating from a main signal.

According to another embodiment, the corresponding front grating tuning sections of the plurality of optical devices are physically coupled to one another and share the drive signal.

According to another embodiment, each of the plurality of optical devices includes at least one corresponding rear grating tuning section or phase tuning section that is configured to independently adjust the corresponding optical lights with respect to frequency while adjusting the predefined nonequivalent relationship.

According to another embodiment, the predefined nonequivalent relationship comprises the corresponding optical lights of the plurality of tunable lasers having at least one of an equal offset, unequal offset, or a predefined ratio relative to one another with respect to frequency.

According to another embodiment, the predefined nonequivalent relationship comprises the frequency of the corresponding optical lights of the plurality of optical devices conforming to a first set of respective channels of an ITU grid prior to the adjustment of the corresponding optical lights with respect to the output parameter, and a second set of respective channels of the ITU grid subsequent to the adjustment.

According to another embodiment, the plurality of tunable lasers are further configured to step the corresponding optical lights of the plurality of tunable lasers along respective channels of an ITU grid.

According to another embodiment, the plurality of tunable lasers are monolithically integrated on a single chip.

According to another embodiment, each of the plurality of tunable lasers comprises at least one of a corresponding rear grating or front grating configured such that, under substantially the same operating conditions, the optical light of the plurality of optical devices are at least one of equivalently offset, nonequivalently offset, or ratioed relative to one another with respect to frequency.

According to another embodiment, the adjustable array device further includes a combiner configured to combine the corresponding optical lights into a combined output.

According to another embodiment, the adjustable array device further includes further including one or more additional redundant tunable lasers.

According to another aspect of the present invention, a method of adjusting an adjustable array device, the adjustable array device comprising a plurality of optical devices each having an optical light output therefrom and configured whereby the corresponding optical lights of the plurality of optical devices have a predefined nonequivalent relationship relative to one another with respect to an output parameter, includes: providing a drive signal to the plurality of optical devices; and adjusting the corresponding optical lights in response to the drive signal with respect to the output parameter while substantially maintaining the predefined nonequivalent relationship.

According to one embodiment, the output parameter is at least one of wavelength, frequency, power, phase, or polarization.

According to another embodiment, the step of adjusting the corresponding optical lights comprises adjusting at least one adjustment section of each of the plurality of optical devices that are configured to adjust the corresponding optical lights in response to the drive signal with respect to the output parameter while substantially maintaining the predefined nonequivalent relationship.

According to another embodiment, the method further includes controlling the corresponding at least one adjustment section of the plurality of optical devices with a controller coupled to and configured to output the drive signal to the corresponding at least one adjustment section of the plurality of optical devices.

According to another embodiment, the controller indirectly couples the corresponding at least one adjustment section of the plurality of optical devices.

According to another embodiment, the drive signal comprises multiple signals originating from a main signal.

According to another embodiment, the corresponding at least one adjustment section of the plurality of optical devices are physically coupled to one another and share the drive signal.

According to another embodiment, the step of adjusting the corresponding optical lights comprises adjusting the corresponding at least one adjustment section of the plurality of optical devices by at least one of voltage, current, temperature, or mechanical manipulation.

According to another embodiment, the method further includes independently adjusting the corresponding optical lights with respect to the output parameter while adjusting the predefined nonequivalent relationship.

According to another embodiment, the step of independently adjusting the corresponding optical lights includes independently adjusting at least one additional adjustment section of each of the plurality of optical devices that that are configured to independently adjust the corresponding optical lights with respect to the output parameter while adjusting the predefined nonequivalent relationship.

According to another embodiment, the predefined nonequivalent relationship comprises the corresponding optical lights of the plurality of optical devices being at least one of equivalently offset, nonequivalently offset, or ratioed relative to one another with respect to the output parameter.

According to another embodiment, the predefined nonequivalent relationship comprises the output parameter of the corresponding optical lights of the plurality of optical devices conforming to a first set of respective values prior to the adjustment of the corresponding optical lights with respect to the output parameter, and a second set of respective values subsequent to the adjustment.

According to another embodiment, the predefined nonequivalent relationship comprises the frequency of the corresponding optical lights of the plurality of optical devices conforming to a first set of respective channels of an ITU grid prior to the adjustment of the corresponding optical lights with respect to the output parameter, and a second set of respective channels of the ITU grid subsequent to the adjustment.

According to another embodiment, the step of adjusting the corresponding optical lights comprises stepping the corresponding optical lights of the plurality of optical devices along respective channels of an ITU grid.

According to another embodiment, the plurality of optical devices comprises at least one of a plurality of tunable lasers, modulators, photodetectors, semiconductor optical amplifiers, polarization controllers, or phase controllers.

According to another embodiment, the method further includes combining the corresponding optical lights into a combined output.

According to another embodiment, the adjustable array device further includes one or more additional redundant optical devices.

The foregoing and other features of the invention are hereinafter described in greater detail with reference to the accompanying drawings.

BRIEF DESCRIPTION OF THE DRAWINGS

FIGS. 2 and 3 are schematic diagrams of exemplary adjustable arrays including a plurality of optical devices composed monolithically on a single chip in accordance with the present invention.

FIGS. 8 and 9 are schematic diagrams of exemplary adjustable arrays including a plurality of discrete optical devices in accordance with the present invention.

DESCRIPTION

Figure 1:
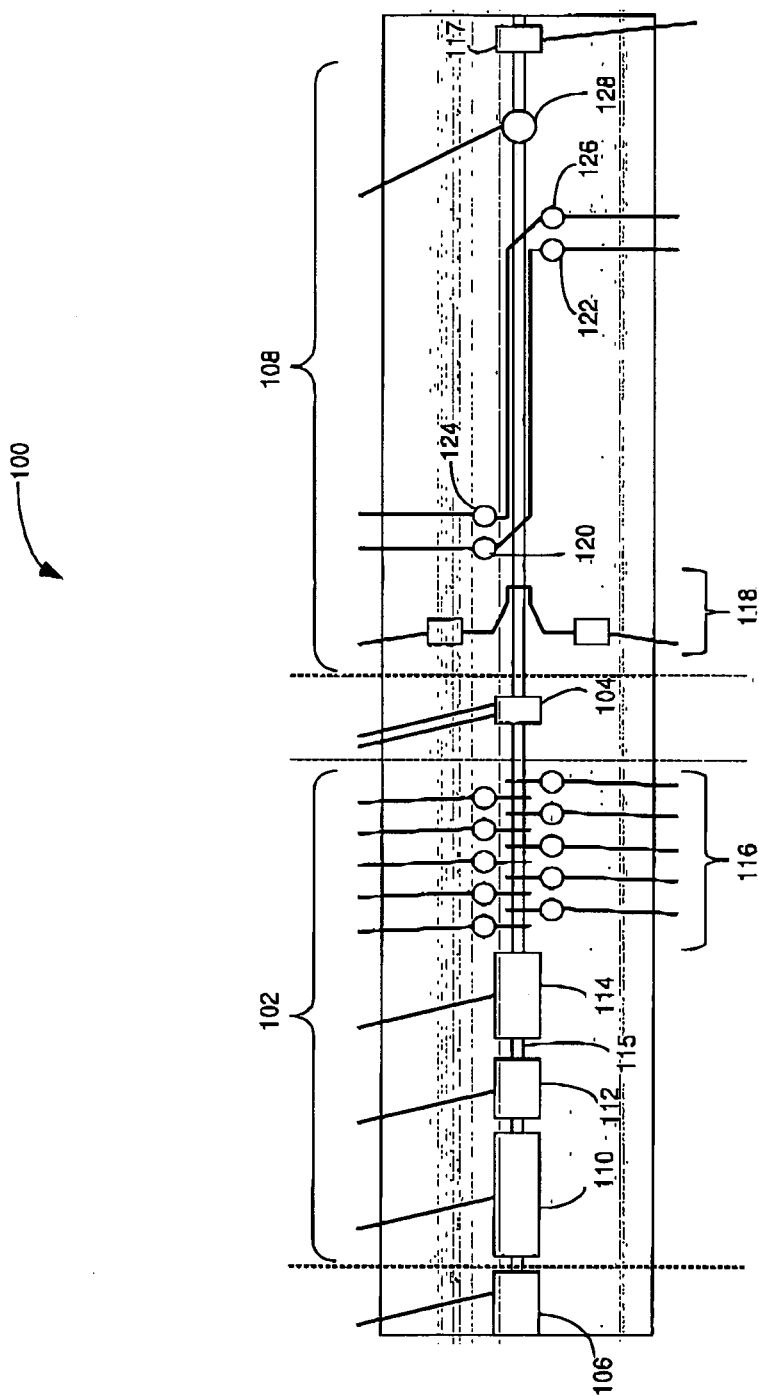
FIG. 1 is a schematic diagram of a conventional optical device comprising a tunable laser, SOA, modulator, and polarization controller.

In the description that follows, like components may be given the same reference numerals, regardless of whether they are shown in different embodiments. To illustrate an embodiment(s) of the present invention in a clear and concise manner, the drawings may not necessarily be to scale and certain features may be shown in somewhat schematic form.

Features that are described and/or illustrated with respect to one embodiment may be used in the same way or in a similar way in one or more other embodiments and/or in combination with or instead of the features of the other embodiments.

Referring now in detail to the drawings and initially to FIG. 1, a conventional optical device, the basic structure of which may be utilized in an exemplary adjustable array device in accordance with the present invention, is shown generally at 100. The optical device 100 includes a tunable laser 102 integrated with a semiconductor optical amplifier (SOA) 104, rear SOA 106, modulator 108, and polarization controller 117. The tunable laser 102 is illustrated as a digital supermode distributed Bragg reflector (DSDBR) laser such as that disclosed in U.S. Pat. No. 7,145,923. The modulator 108 of the optical device is illustrated as a Mach-Zehnder interferometer modulator. The DSDBR laser 102, SOA 104, and Mach-Zehnder modulator 108 are monolithically integrated and form an integrated laser Mach-Zehnder (ILMZ) device. While the optical device 100 will be illustrated and described chiefly in this context, it is to be understood that the design of the optical device 100 may be any other suitable design. The particular design of the optical device 100, including the tunable laser 102, SOAs 104 and 106, modulator 108, and polarization controller 117 is not germane to the invention in its broadest sense.

As an example, the tunable laser 102 of the optical device 100 may be an electronic tunable laser such as a three-section DBR, a sampled grating DBR Laser (SG-DBR), a superstructure grating DBR laser (SSG-DBR), a grating assisted co-directional coupler laser with sampled grating reflector (GCSR) or a Y-junction laser (Y3 Laser). The tunable laser 102 may also be a mechanical tuning laser such as a microelectromechanical tunable vertical cavity surface emitting laser (MEM-VCSEL) or external cavity laser (ECL).

The tunable laser 102 generally includes a rear grating tuning section 110, phase control tuning section 112, gain section 114, front grating tuning section 116, and common waveguide 115. Adjustment of the front grating tuning section 116 and/or rear grating tuning section 110 adjusts the frequency (wavelength) of the optical output. The gratings largely define what frequency (wavelength) is output for given currents in the tuning sections. Adjustment of the phase control tuning section 112 fine tunes the frequency of the optical output, and adjustment of the gain section 114 adjusts the gain of the optical output. For the sake of brevity, the specific structure and functionality of each of the components of the wavelength tunable laser 102 will not be described in detail.

The rear grating of the tunable laser 102 is optically coupled to a rear SOA 106 for amplifying light output from rear grating. In one embodiment, an output of the rear SOA 106 may be optically coupled to an external wavelength locker (not shown). The wavelength locker may be utilized in combination with e.g. a controller and may provide correction factors to one or more of the sections of the tunable laser 102 for maintaining the wavelength of output light.

The front grating of the tunable laser is optically coupled to a SOA 104 for amplifying light that is output from the front grating to the modulator 108, and the modulator is optically coupled to a polarization controller 117 for controlling the polarization of the optical light. Adjustment of the SOA 104 adjusts the power level of the optical output from the tunable laser 102. As illustrated, the Mach-Zehnder modulator includes imbalance control electrodes 118, RF inputs 120 and 124, RF grounds 122 and 126, and optical power monitor 128. The modulator 108 is provided for modulating the optical output of the wavelength tunable laser 102 and allowing the optical device 100 to perform its intended functionality. For example, exemplary modulation formats for modulating the output of the tunable laser 102 include, for example, 40 G OOK, 40 G QPSK (2×20 G), 25 G Duobinary, and 10 G OOK. In one embodiment, the optical device 100 (e.g. ILMZ) is suitable for use in optical telecommunications. The Mach-Zehnder modulator is well known in the art, and the specific structure and functionality of each of the identified components will not be described in detail for the sake of brevity.

The optical device 100 illustrated in FIG. 1 is potentially suitable for a wide range of reach and ITU grid spacing. Accordingly, the use of multiple optical devices such as that illustrated in FIG. 1 may provide a tunable array with the versatility to eliminate the need for the use of many variants of fixed wavelength optical devices. For example, a plurality of optical devices 100 may be individually tuned and combined to produce a block of optical outputs on a particular ITU grid (e.g. on adjacent 100 GHz, 50 GHz, 33 GHz, 25 GHz, or 12.5 GHz grid points).

But optical devices such as that illustrated in FIG. 1 include a significant number of contacts. To independently array ten of the optical devices 100 illustrated in FIG. 1 would require approximately 220 contact pads (22 contact pads per device). An adjustable array formed from multiple individual optical devices is also difficult to tune, test, and control at high yield. For example, the output frequency of one optical device typically differs from another even when operated at the same currents and temperature due to subtle differences in waveguide geometry arising from the manufacturing process, as well as variations in the thicknesses of the semiconductor layers from which the optical devices are manufactured. Accordingly, such an implementation would be a 'sledge hammer' approach with a high degree of complexity.

Optical devices such as that illustrated in FIG. 1 are commonly manufactured on a wafer along with many other similar devices (in many cases more than 1000 at a time). Individual optical devices 100 are commonly formed by cleaving the wafer into bars (each bar including multiple devices), coating the device facets, and ultimately cleaving the bars into individual chips.

It has been found by the Inventors that when the sections of similarly-fabricated neighboring optical devices 100 on a wafer are driven by the same or similar current or voltage, such devices will achieve corresponding optical outputs having the same or similar output parameters. For example, analysis of the optical output of a large number of devices indicates that at least 67% of optical devices on adjacent chips are within 15 GHz of each other when similar DC settings are applied. This is due much in part to the close proximity of the optical devices. In addition, variances in the optical output are minimized by the reduction in thermal differences among the optical devices which is associated with the integration of devices together in the array. Further advantages associated with integrating the optical devices together include reduction of electrical interconnect resistance and optical losses, as well as reduction in the overall size of the array.

In accordance with these principles, and as set forth in the following description, an adjustable array of optical devices may be monolithically integrated on a single chip. The adjustable array includes a plurality of optical devices, each optical device having an optical light output therefrom at a predefined nonequivalent relationship relative to one another with respect to an output parameter. As used herein, the output parameter of the optical light may be any measurable parameter such as, for example, wavelength, frequency, power, phase, or polarization. Also, the term predefined nonequivalent relationship includes any suitable nonequivalent relationship such as, for example, an equal offset, unequal offset, a predefined ratio, etc. For example, in an embodiment where the predefined nonequivalent relationship is an equal offset, an output parameter of the corresponding optical lights of the plurality of optical devices may be e.g. X, X+ΔY, X+2ΔY, X+3ΔY, etc. Similarly, in an embodiment where the predefined nonequivalent relationship is an unequal offset, an output parameter of the corresponding optical lights of the plurality of optical devices may be e.g. X, X+ΔY, X+ΔY+ΔZ, X+ΔY+ΔZ+ΔW, etc. In an embodiment where the predefined nonequivalent relationship is a predefined ratio, an output parameter of the corresponding optical lights of the plurality of optical devices may be e.g. X, 2X, 3X, 4X, etc. Adjustment of the predefined nonequivalent relationship is described below.

Of course, it is contemplated that the corresponding optical lights may have at least an additional output parameter that is equivalent among the corresponding optical lights of the plurality of optical devices. For example, in an embodiment where the predefined nonequivalent relationship pertains to the frequency of the corresponding optical lights, said corresponding optical lights may be output at an equivalent power.

In accordance with the present invention, a common drive signal (e.g., current or voltage) may be applied to at least one of the respective adjustment sections of the plurality of optical devices. In response to the common drive signal, the at least one adjustment section of each optical device may adjust the optical light by at least one of voltage, current, temperature, or mechanical manipulation. Adjustment of the respective adjustment sections via the common drive signal allows for adjustment of the corresponding optical lights with respect to an output parameter while substantially maintaining a predefined nonequivalent relationship with respect to the output parameter.

FIGS. 2 and 3 generally illustrate various embodiments of an adjustable array 1000 in which the common drive signal may be applied to the corresponding at least one adjustment section 1002a-d of the plurality of optical devices 1000a-d. In accordance with the present invention, the at least one adjustment section 1002a-d of each optical device are commonly coupled to one another and to a controller 1004. The controller 1004 is configured to output a common drive signal (e.g., a current or voltage) to the corresponding at least one adjustment section 1002a-d of the plurality of optical devices 1000a-d. As illustrated in FIG. 2, the at least one adjustment section 1002a-d of each optical device may be physically coupled to one another (and to the controller) and share the common drive signal. In such an embodiment, the corresponding at least one adjustment sections 1002a-d may be joined via common metallization during the fabrication process of the adjustable array 1000. Accordingly, the adjustable array 1000 may include a reduced number of contacts and/or a reduced number of current sources used to drive the optical devices 1000a-d. The tuning set-up of the adjustable array (discussed below) is also simplified.

As illustrated in FIG. 3, the respective at least one adjustment sections 1002a-d may not be physically coupled, but may instead be commonly coupled and driven by the controller. Such coupling is herein referred to as indirect coupling (or may also be referred to as algorithmic coupling). In this embodiment, the drive signal provided by the controller 1004 comprises multiple signals, each provided to a respective at least one adjustment section. The multiple signals may be derived from a main signal. For example, a control input signal to the controller 1004 may result in the output of a drive signal comprising individual but related signals to the respective at least one adjustment sections 1002a-d. The individual but related signals may be the same or different.

Accordingly, the present invention provides an adjustable array of a plurality of optical devices each having an optical light output therefrom at a predefined nonequivalent relationship relative to one another with respect to an output parameter. As described above, the output parameter of the optical light may be any measurable parameter such as, for example, wavelength, frequency, power, phase, or polarization. Furthermore, each of the optical devices include at least one adjustment section that, in response to a common drive signal, is configured to adjust the corresponding optical lights with respect to the output parameter while substantially maintaining the predefined nonequivalent relationship.

Figure 4:
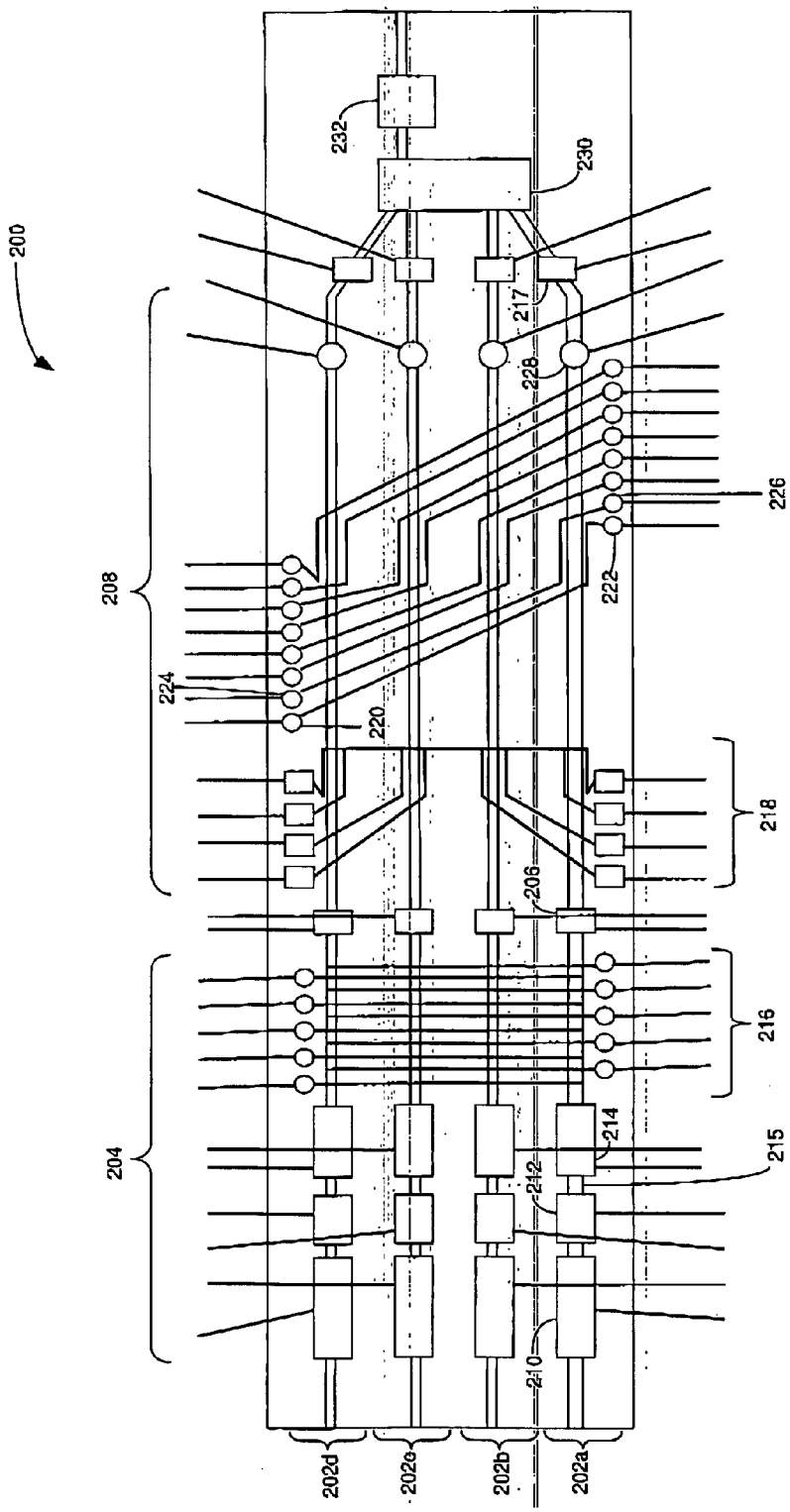
FIG. 4 is a schematic diagram of an exemplary adjustable array including a plurality of optical devices composed monolithically on a single chip in accordance with the present invention, wherein each optical device comprises a tunable laser, SOA, modulator, and polarization controller.

FIG. 4 illustrates an exemplary adjustable array 200 in accordance with the present invention wherein the corresponding optical lights output therefrom have a predefined nonequivalent relationship relative to one another with respect to an output parameter. The adjustable array 200 includes a plurality of similarly fabricated optical devices 202a-d monolithically integrated on a single chip. The structure of each optical device 202a-d included in the adjustable array device 200 is similar to the structure of the optical device 100 of FIG. 1 in the respect that, for each device, a tunable laser 204 (e.g. including a rear grating tuning section 210, phase control tuning section 212, gain section 214, front grating tuning section 216, and common waveguide 215) is monolithically integrated with a SOA 206, a modulator 208 (e.g. including imbalance control electrodes 118, RF inputs 120 and 124, RF grounds 122 and 126, and optical power monitor 128), and a polarization controller 217.

As illustrated in the exemplary embodiment of FIG. 4, the front grating tuning section 216 of each of the optical devices 202a-d are commonly coupled to one another and share a common drive signal (i.e. current or voltage source from a controller as described above). That is, each contact (and associated current or voltage source) is physically coupled to the front grating tuning section of each optical device. Although in another embodiment, the front grating tuning section of each optical device may instead be indirectly coupled (i.e. by the controller) in the manner described above in FIG. 3. Adjusting the commonly coupled front grating tuning sections 216 (i.e., via the common drive signal) adjusts the corresponding optical lights of the plurality of optical devices with respect to frequency/wavelength while substantially maintaining the predefined nonequivalent relationship with respect to frequency/wavelength.

Figure 5:
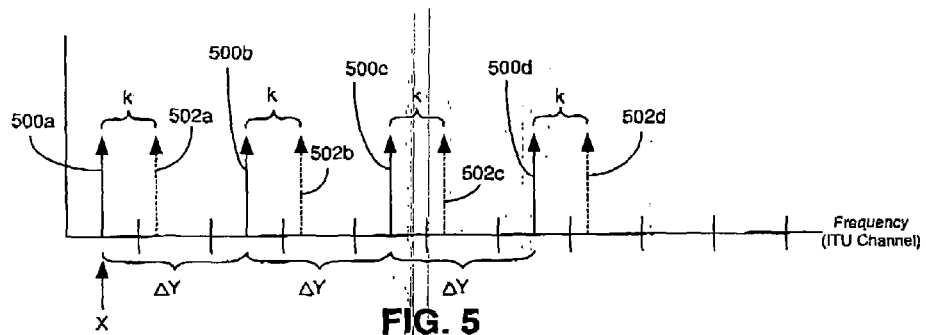
FIGS. 5-7 are graphs illustrating an exemplary adjustment of an output parameter (e.g. frequency) of the corresponding optical lights in accordance with the present invention.
Figure 6:
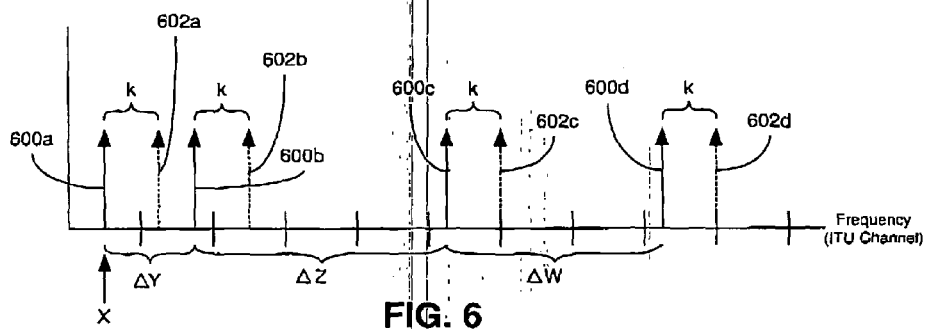

FIGS. 5 and 6 illustrate adjustment of corresponding optical lights with respect to the output parameter while substantially maintaining the predefined nonequivalent relationship, using frequency as an exemplary output parameter. In FIG. 5, the predefined nonequivalent relationship is an equal offset (e.g. X, X+ΔY, X+2ΔY, X+3ΔY). Here, the output parameter (e.g. frequency) of the corresponding optical lights of the plurality of optical devices conforms to a first set of respective values 500a-d prior to the adjustment of the corresponding optical lights with respect to the output parameter (e.g. frequency), and a second set of respective values 502a-d subsequent to adjustment. That is, as a result of an adjustment made to the drive signal, the output parameter (e.g. frequency) of the corresponding optical lights of the plurality of optical devices is adjusted by amount k. In FIG. 6, the predefined nonequivalent relationship is an unequal offset (e.g., X, X+ΔY, X+ΔY+ΔZ, X+ΔY+ΔZ+ΔW). Similar to the exemplary embodiment in FIG. 5, the output parameter (e.g. frequency) of the corresponding optical lights of the plurality of optical devices conforms to a first set of respective values

600*a-d* prior to the adjustment of the corresponding optical lights with respect to the output parameter (e.g. frequency), and a second set of respective values 600*a-d* subsequent to adjustment. Again, as a result of an adjustment made to the drive signal, the output parameter (e.g. frequency) of the corresponding optical lights of the plurality of optical devices is adjusted by amount k.

In an embodiment such as those illustrated in FIGS. 5 and 6 where the output parameter is frequency, the frequency of the corresponding optical lights of the plurality of optical devices may conform to a first set of respective channels of an ITU grid prior to the adjustment of the corresponding optical lights, and a second set of respective channels of the ITU grid subsequent to the adjustment. That is, the corresponding optical lights of the plurality of optical devices may be stepped along respective channels of an ITU grid. An adjustable array in accordance with the present invention may be utilized for conforming to various ITU grids (e.g., 200 GHz spacing, 100 GHz spacing, 50 GHz spacing, etc.). And each of the lasers are adjustable such that the respective wavelengths of the optical lights may be configured to conform to channels (adjacent or non-adjacent) located anywhere along the ITU grid (e.g. in the C-Band, L-band, etc., on an ITU grid). For example, in an embodiment where the adjustable array outputs 4 channels separated by 100 GHz and modulated at 25 Gb/s Duobinary, these 4 channels could be, e.g., channels 1, 2, 3, 4; channels 23, 24, 25, 26; or channels 45, 46, 47, 48 of the 100 GHz ITU grid. As another example, in an embodiment where the adjustable array outputs 10 channels separated by 100 GHz and modulated at 10 Gb/s OOK, these 10 channels can be any combination of 10 channels on the ITU grid (e.g., channels 1-10, 13-22, etc.).

The predefined nonequivalent relationship of the corresponding optical lights output from the plurality of optical devices may be realized in a number of ways. With continued reference to FIGS. 2 and 3, each of the plurality of optical devices 1000 may comprise at least one additional adjustment section 1006*a-d*. The at least one additional adjustment section 1006*a-d* of each optical device is also configured to adjust the corresponding optical lights with respect to the output parameter (e.g. in response to an independent drive signal provided by the controller). Similar to the at least one adjustment section 1002*a-d*, the at least one additional adjustment section 1006*a-d* of each optical device may adjust the optical light by at least one of voltage, current, temperature, or mechanical manipulation. However, the at least one additional adjustment section is configured to independently adjust the corresponding optical light with respect to the output parameter while adjusting the predefined nonequivalent relationship. That is, the additional adjustment section of a particular optical device may adjust the output parameter of the optical light of that particular optical device, independent of the other optical devices. For example, with reference to FIG. 4, the predefined nonequivalent relationship may be adjusted by independent adjustment of the rear grating tuning section 210 or the phase control tuning section 212 of each of the optical devices 202*a-d*.

Figure 7:
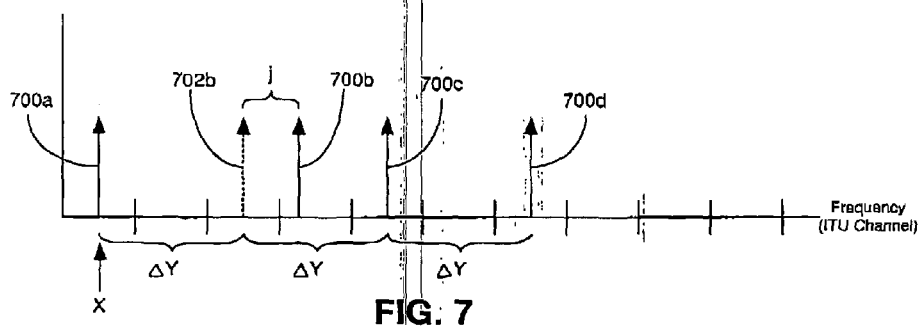

The at least one additional adjustment section of each of the optical devices may be used, for example, to set and/or fine tune predefined nonequivalent relationship. For example, FIG. 7 illustrates an embodiment using frequency as an exemplary output parameter wherein the optical lights of the plurality of optical devices conform to a set of respective values 700*a-d* and an equal offset (e.g. X, X+ΔY, X+2ΔY, X+3ΔY) predefined nonequivalent relationship is desired. Here, the at least one additional adjustment section of one of the plurality of optical devices is used to independently adjust the output parameter (e.g. frequency) of a corresponding optical lights from a first value 700*b* to a second value 702*b* by the amount j in order to achieve the equal offset. In an embodiment where the output parameter is frequency, the at least one additional adjustment section 1006*a-d* may independently adjust the corresponding optical lights to conform to a set of respective channels of an ITU grid. Accordingly, the commonly driven at least one adjustment sections 1002*a-d* may first be used as a coarse adjuster to adjust the optical lights with respect to an output parameter, and the individually driven at least one additional adjustment section 1006*a-d* may subsequently be used to more finely adjust each individual optical light.

In another embodiment, the optical devices of the array may be configured during manufacture to impart a difference in laser output parameter and thereby impart a predefined nonequivalent relationship. For example, in the embodiment illustrated in FIG. 4, the rear grating (as well as the front grating) of the plurality of optical devices 202*a-d* may be designed and fabricated (e.g. using Bragg gratings of varying pitches) so that the wavelength of each respective optical device of the array is progressively staggered by a given amount (e.g. 100 GHz). For example, the optical devices may respectively include Bragg gratings of varying pitch similar to that disclosed in U.S. Pat. No. 5,930,278. In one embodiment, the array may achieve wavelength outputs that are already staggered by a desired amount (e.g., an amount specified by an ITU grid such as 100 GHz). Of course, at least one additional adjustment section of each of the optical devices may be used in combination with this staggered design and fabrication to set and/or fine tune the predefined non-equivalent relationship.

In yet another embodiment, the controller may impart and/or adjust the predefined non-equivalent relationship of the optical lights output from the plurality of optical devices. As described above in relation to FIG. 3, the respective at least one adjustment sections 1002*a-d* may be commonly coupled and driven by the controller 1004 (i.e. indirectly coupled). In this embodiment, the predefined non-equivalent relationship may be imparted by the multiple signals that comprise the drive signal. For example, the corresponding front grating tuning sections 216 of FIG. 4 may instead be indirectly coupled via the controller, and the respective signals that comprise the drive signal may operate to impart and/or adjust the predefined nonequivalent relationship with respect to frequency.

While FIG. 4 exemplifies the features of the present invention with respect to frequency, it is to be understood that at least one adjustment section other than or in addition to the front grating tuning section may be commonly coupled and driven, and that the output parameter of the optical light may be any measurable parameter such as, for example, wavelength, frequency, power, phase, or polarization. For example, one or more of the corresponding gain section 214, rear grating tuning section 210, phase control tuning section 212, polarization controller 217, and/or SOA 206 of each optical device 202*a-d* may be commonly driven and adjusted by a common drive signal. Common coupling of these adjustment sections and the adjustment thereof is the same as described in the aforementioned description. In an embodiment where one or more of the corresponding gain section 214, phase control tuning section 212, polarization controller 217 and/or SOA 206 are commonly driven and adjusted by a common drive signal, each optical device may include an additional gain section, phase control tuning section, polarization controller and/or SOA for independent fine tuning.

It is also contemplated that one or more sections of the modulator 208 of each of the optical devices 202*a-d* of the adjustable array 200 may share a common current or voltage source. For example, a common DC bias may be applied to the RF electrodes 220 and/or 224 of each modulator 208 via a bias-T and a common voltage source.

The adjustable array 200 of FIG. 4 includes four optical devices 202a-d. In one embodiment, the four device adjustable array 200 of FIG. 4 may operate to produce four channels (adjacent or non-adjacent), with each channel having a data rate of about 25 Gb/s. But it is contemplated that any suitable data rate may be produced by the optical devices 202a-d. Of course, it should be noted that the line rate quoted is generally lower than the actual needed, as an overhead is required to implement FEC (Forward Error Correction). Typically about 11.5 Gbs is needed for a 10 Gb/s channel, about 28 Gb/s is needed for 25 Gbs, and about 116 Gb/s is needed for 100 Gb/s, etc. It is also contemplated that any suitable number of optical devices may be included in the adjustable array. For example, adjustable array 200 may include ten optical devices. In one embodiment, the ten channel adjustable array may operate as a ten channel array to produce ten channels (adjacent or non-adjacent) ITU channels, each channel having a bandwidth of about 10 Gb/s each.

In some embodiments, the adjustable array may include one or more additional redundant optical devices. These redundant optical devices are additional optical devices included in the array and would normally be in a standby mode but could be used in the event of failure of one of the other optical devices of the array. For example a 4×25 Gb/s array chip could include one additional optical device. Elements and a 10×10 Gb/s array could include one or two additional optical devices to allow for redundancy.

Figure 10:
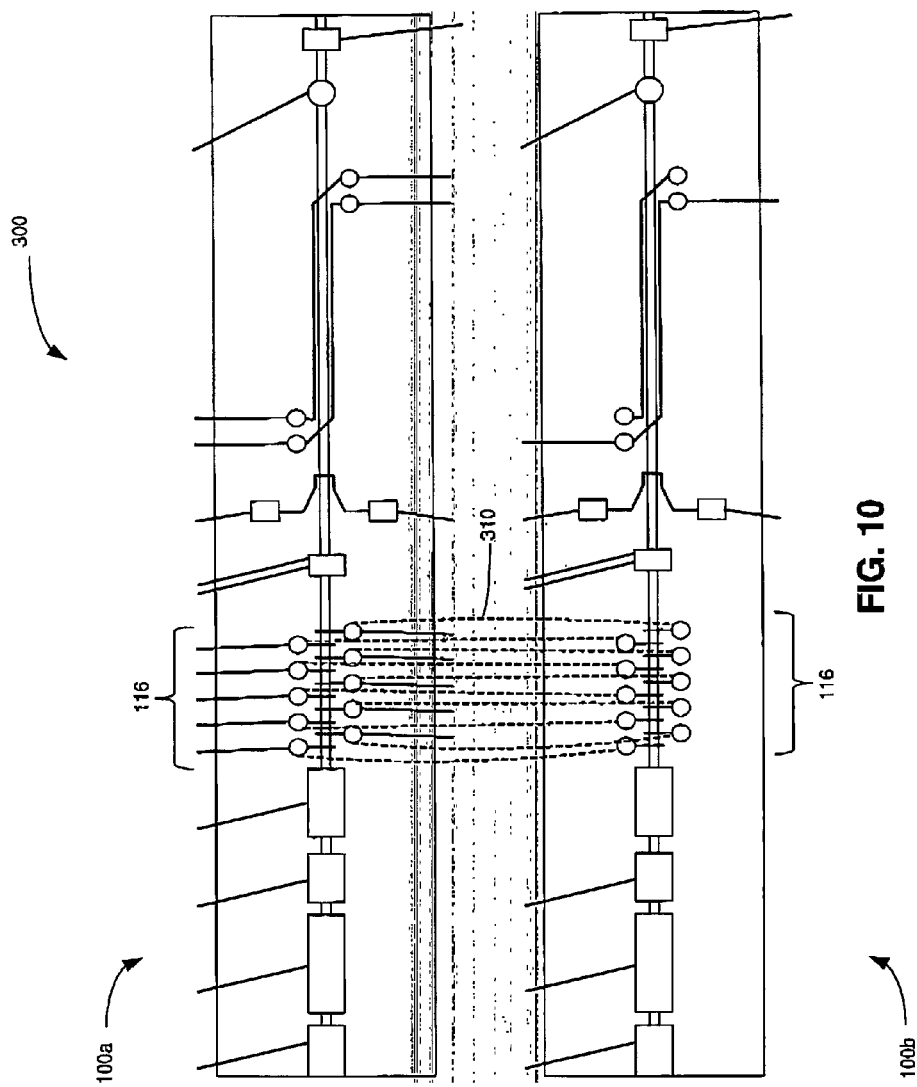
FIG. 10 is a schematic diagram of an exemplary adjustable array including a plurality of discrete optical devices in accordance with the present invention, wherein each discrete optical device comprises a tunable laser, SOA, modulator, and polarization controller.

Even if the adjustable array is not composed monolithically at bar level, there is still an advantage to assembling an adjustable array of discrete optical devices using a common current or voltage in terms of simplified control and the use of a reduced number of current or voltage sources. FIGS. 8 and 9 generally illustrate various embodiments of the adjustable array 1000 in which the common drive signal may be applied to the at least one adjustment section 1002a-d of the plurality of discrete optical devices 1000a-d. Similar to FIGS. 2 and 3, the at least one adjustment section 1002a-d may be physically coupled (e.g. via wire bond 1010), or the at least one adjustment section 1002a-d may be indirectly coupled (i.e. coupled via the controller). FIG. 10 illustrates a portion of an exemplary adjustable array device 300 in accordance with the present invention in which the array is formed from a plurality of discrete optical devices 100a-b illustrated in FIG. 1. Similar to the adjustable array device 200 of FIG. 4, the front grating tuning section 116 of each optical device 100a-b is driven by common drive signal. These sections of the optical devices are coupled via wire bond 310. Of course the front grating tuning section 116 may instead be indirectly coupled (i.e. coupled to the controller) as in the embodiment of FIG. 9.

With continued reference to FIG. 4, the respective outputs of the optical devices 202a-d may be coupled together using a combiner 230. The combiner 230 may be integrated on the chip (as illustrated) or may be a separate external device (as may also be the case in the embodiment of FIG. 10). The specific combiner 230 utilized may depend on the number of channels that make up the adjustable array 200. For example, in the embodiment illustrated in FIG. 4 where the array includes four channels, the optical outputs may be combined using a 4×4 MMI as a combiner. In another embodiment where the array includes ten channels, the outputs may be combined using a 10 channel AWG as a combiner. The combined output may be optically coupled to SOA 232 and output from the adjustable array 200.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An adjustable array device, including:
    a plurality of light sources each having an optical light output therefrom and configured whereby the corresponding optical light outputs of the plurality of light sources have a predefined nonequivalent relationship relative to one another with respect to a parameter of the optical light outputs; and
    a plurality of front grating tuning sections each electrically coupled to a common drive signal, each front grating tuning section optically coupled to a corresponding one of the plurality of light sources, the plurality of front grating tuning sections configured to adjust the parameter of the optical light output of the corresponding one of the plurality of light sources such that the predefined nonequivalent relationship is substantially maintained, the adjusting being responsive to the common drive signal; and
    at least one additional rear grating adjustment section that, responsive to a signal other than the common drive signal, is configured to independently adjust the parameter of the optical light output of a corresponding one of the plurality of light sources and alter the predefined nonequivalent relationship.

2. The adjustable array device of claim 1, wherein the parameter is at least one of wavelength, frequency, power, or phase.

3. The adjustable array device of claim 1, further comprising:
    a controller coupled to the plurality of front grating tuning sections and configured to provide the common drive signal to each front grating tuning section.

4. The adjustable array device of claim 3, wherein the controller is configured to split the common drive signal into a plurality of drive signals, each of the plurality of drive signals being coupled to a corresponding one of the plurality of front grating tuning sections.

5. The adjustable array device of claim 3, wherein the plurality of front grating tuning sections are physically coupled to one another and share the common drive signal.

6. The adjustable array device of claim 1, wherein the predefined nonequivalent relationship comprises the parameter of the optical light outputs of the plurality of light sources having at least one of an equal offset, unequal offset, or a predefined ratio relative to one another with respect to the parameter.

7. The adjustable array device of claim 1, wherein the predefined nonequivalent relationship comprises the parameter of the optical light outputs conforming to a first set of respective values prior to the adjustment of the parameter, and a second set of respective values subsequent to the adjustment of the parameter.

8. The adjustable array device of claim 1, wherein the predefined nonequivalent relationship comprises a frequency of the corresponding optical light outputs conforming to a first set of respective channels of an International Telecommunication Union grid prior to the adjustment of the parameter, and a second set of respective channels of the International Telecommunication Union grid subsequent to the adjustment of the parameter.

9. The adjustable array device of claim 1, wherein the plurality of light sources comprises at least one of a plurality of tunable lasers, modulators, semiconductor optical amplifiers, or phase controllers.

10. The adjustable array device of claim 1, wherein the plurality of light sources are a plurality of tunable lasers and the parameter is frequency.

11. The adjustable array device of claim 10, wherein each of the plurality of tunable lasers includes a corresponding rear grating tuning section that, in response to a rear grating drive signal, independently adjusts the corresponding optical light output, the independently adjusting altering the predefined nonequivalent relationship.

12. The adjustable array device of claim 1, further comprising:
at least one phase tuning section that is configured to independently adjust the phase of the optical light output of a corresponding one of the plurality of light sources, the independently adjusting altering the predefined nonequivalent relationship.

13. The adjustable array device of claim 1, wherein the predefined nonequivalent relationship comprises frequencies of the optical light outputs conforming to a first set of respective channels of an International Telecommunication Union grid prior to the adjustment of the parameter, and a second set of respective channels of the International Telecommunication Union grid subsequent to the adjustment of the parameter.

14. The adjustable array device of claim 10, wherein the predefined non-equivalent relationship comprises frequencies of the optical light outputs being at least one of equivalently offset, nonequivalently offset, or ratioed relative to one another.

15. A method of adjusting an adjustable array device, the adjustable array device comprising a plurality of light sources each having an optical light output therefrom and configured whereby the corresponding optical light outputs of the plurality of light sources have a predefined nonequivalent relationship relative to one another with respect to a parameter of the optical light outputs, the method including:
providing a common drive signal to each of a plurality of front grating tuning sections, each front grating tuning section corresponding to one of the plurality of light sources; and
adjusting the parameter of the optical light output of a corresponding one of the plurality of light sources such that the predefined nonequivalent relationship is substantially maintained, the adjusting being responsive to the common drive signal; and
responsive to a signal other than the common drive signal, adjusting at least one additional rear grating adjustment section to independently adjust the parameter of the optical light output of a corresponding one of the plurality of light sources and alter the predefined nonequivalent relationship.

16. The method of claim 15, wherein the parameter is at least one of wavelength, frequency, power, or phase.

17. The method of claim 15, wherein the step of adjusting the parameter of the optical light output of the corresponding one of the plurality of light sources comprises applying at least a portion of the common drive signal to each of the plurality of front grate tuning sections.

18. The method of claim 15, further including controlling the plurality of front grate tuning sections with a controller that is indirectly coupled to and configured to output the common drive signal to the plurality of front grating tuning sections.

19. The method of claim 15, wherein the plurality of front grating tuning sections are physically coupled to one another and share the common drive signal.

20. The method of claim 15, further including independently adjusting the at least one additional adjustment section corresponding to at least one of the plurality of light sources, the at least one additional adjustment section configured to independently adjust the parameter of the optical light output of the corresponding light source, the independently adjusting altering the predefined nonequivalent relationship.

21. The method of claim 15, wherein the predefined nonequivalent relationship comprises the parameter of the optical light outputs of the plurality of light sources being at least one of equivalently offset, nonequivalently offset, or ratioed relative to one another.

22. The method of claim 15, wherein the predefined nonequivalent relationship comprises the parameter of the optical light outputs of the plurality of light sources conforming to a first set of respective values prior to the adjustment of the parameter, and a second set of respective values subsequent to the adjustment of the parameter.

23. The method of claim 15, wherein the predefined nonequivalent relationship comprises a frequency of the corresponding optical light outputs conforming to a first set of respective channels of an International Telecommunication Union grid prior to the adjustment of the parameter, and a second set of respective channels of the International Telecommunication Union grid subsequent to the adjustment of the parameter.

24. The method of claim 15, wherein the plurality of light sources comprises at least one of a plurality of tunable lasers, modulators, semiconductor optical amplifiers, or phase controllers.

* * * * *